US005592504A

United States Patent [19]

Cameron

[11] Patent Number: 5,592,504

[45] Date of Patent: Jan. 7, 1997

[54] TRANSVERSELY EXCITED NON WAVEGUIDE RF GAS LASER CONFIGURATION

[76] Inventor: Harold A. Cameron, 1539 Baker St., Ste. B, Costa Mesa, Calif. 92626

[21] Appl. No.: 541,888

[22] Filed: Oct. 10, 1995

[51] Int. Cl.$^{6}$ .......... H01S 3/03

[52] U.S. Cl. .......... 372/61; 372/82; 372/92; 372/69; 372/34; 372/19; 372/83; 372/98; 372/87

[58] Field of Search .......... 372/61, 82, 92, 372/69, 72, 34, 87, 19, 83, 98

[56] References Cited

U.S. PATENT DOCUMENTS

| | | | |
|---|---|---|---|
| 3,787,781 | 1/1974 | Medicus et al. | 372/87 |
| 4,589,114 | 5/1986 | Sutter, Jr. . | |
| 4,596,018 | 6/1986 | Gruber et al. . | |
| 4,618,961 | 10/1986 | Sutter, Jr. | 372/82 |
| 4,620,306 | 10/1986 | Sutter, Jr. | 372/82 |
| 5,475,703 | 12/1995 | Scalise et al. | 372/82 |

*Primary Examiner*—Leon Scott, Jr.
*Attorney, Agent, or Firm*—James G. O'Neill

[57] ABSTRACT

A gas laser consisting of a single elongated piece of dielectric material (1), with two hermetically sealed parallel elongated chambers (2) and (3), and an opening (4) connecting the two chambers. One of the elongated chambers (2) is of a cross section suitable for confining a laser gas discharge. The other elongated chamber (3) is a reservoir for laser gas, which also functions to dampen the unwanted acoustic waves generated by the laser gas discharge and as a means of extending the operating lifetime of the laser gas. The opening connecting the two elongated chambers serves to dampen the acoustic waves generated by the laser gas discharge traveling the length of the elongated laser chamber and to stop unwanted low angle wall reflections of laser light energy traveling at a slight angle to the length of the laser chamber.

13 Claims, 1 Drawing Sheet

TRANSVERSELY EXCITED NON WAVEGUIDE RF GAS LASER CONFIGURATION

BACKGROUND OF THE INVENTION

1. Field of the Invention

This invention relates generally to gas lasers, and more particularly, to an improved high power, large double bore RF powered gas laser.

2. Description of the Related Art

It is generally known that higher power output energy can be obtained from a gas laser if the diameter of the laser chamber is made larger. For example, a waveguide laser will have a laser chamber which is about 1–2 millimeters in cross-section, while a higher power, large bore laser will have a laser chamber which ranges from about 0.25 inches in diameter to over 0.5 inches in diameter. Furthermore, the length of the laser chamber in such large bore, higher power lasers is also increased. Such elongated laser chambers usually have continuous, smooth internal side walls which reflect unwanted low angle laser light energy traveling along the length of the laser chamber, at a slight angle to the length of the laser chamber. At this slight angle, the reflections work their way around the inside diameter of the laser chamber, and produce unwanted laser modes which are difficult to deal with. One known way to reduce these laser wall modes is by placing apertures inside the laser chamber. However, these internal apertures reduce laser output power. Apertures may also be placed outside of the laser chamber for clipping the unwanted laser energy.

U.S. Pat. No. 4,589,114, discloses a gas laser having an elongated cylindrical chamber with a plurality of groves formed on the internal surface to provide optical mode control. Additionally, this patent discloses numerous electrode configurations to transversely excite the gas, such as $CO_2$, in the cylindrical chamber, to produce a laser discharge which is reflected and guided by a pair of reflectors mounted at the ends of the cylindrical chamber. This patent, however, fails to disclose a double bore laser.

U.S. Pat. Nos. 4,596,018 and 4,618,916 also disclose gas discharge lasers having elongated cylindrical laser chambers with external electrodes transverse to the laser chamber. These patents, however, also fail to disclose double bore lasers.

Another problem seen with an increase in gas laser size is that acoustic waves are generated within the gas laser discharge thus affecting the rate at which the laser can be modulated. Most lasers do not operate in the continuous wave mode but are modulated at a frequency between 0 and 60 KHz. Therefore, when the laser modulation rate and the acoustic waves inside the laser are at the same frequency, the laser output power is reduced dramatically.

There is, therefore, a need in the art for an improved RF powered high power laser. The present invention provides such an improvement, by reducing unwanted wall reflections without losing laser output power, and reducing acoustic waves inside the laser cavity to a level which does not affect the power output during modulation.

SUMMARY OF THE INVENTION

It is therefore an object of the present invention to provide a means of eliminating unwanted laser wave reflections in a laser cavity and to improve laser beam quality and laser power output.

It is another object of the present invention to provide a means of eliminating unwanted acoustic waves which are generated in a laser gas discharge within an RF excited gas laser, so as to improve the laser modulation and performance thereof.

It is a further object of the present invention to provide a gas laser with a gas reservoir connected to a separate laser chamber, for efficient gas exchange between the laser and reservoir chambers, so as to increase the operating lifetime of the laser gas.

These and other objects and advantages are achieved by providing an improved gas laser having an elongated cylindrical body with separate elongated cylindrical chambers formed therein, with an opening in the laser body connecting the separate chambers. A plurality of electrodes are placed longitudinally along the exterior of the laser body, and these electrodes are excited by an RF generator electrically connected thereto.

BRIEF DESCRIPTION OF THE DRAWINGS

The objects and features of the present invention, which are believed to be novel, are set forth with particularity in the appended claims. The present invention, both as to its organization and manner of operation, together with further objects and advantages may best be understood by reference to the following description, taken in connection with the accompanying drawings, in which:

DESCRIPTION OF THE PREFERRED EMBODIMENTS

Figure 1:
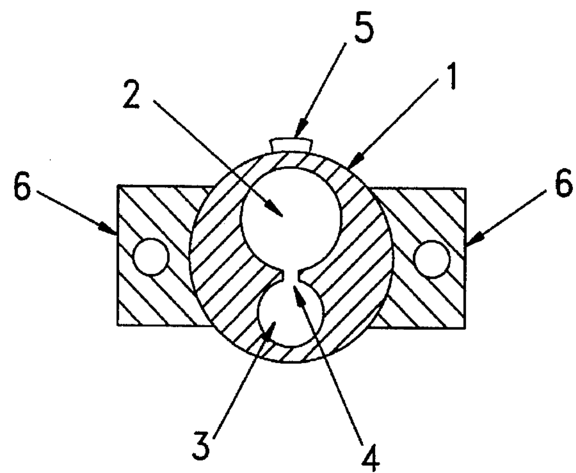
FIG. 1 is a schematic cross-sectional, elevational view of a gas laser of the present invention showing separate laser gas discharge and laser gas reservoir chambers, connected by a central opening, with a positive electrode mounted to the exterior of the laser adjacent the laser gas chamber, and two water cooled ground electrodes mounted on the exterior surface of the laser opposite to each other.
Figure 2:
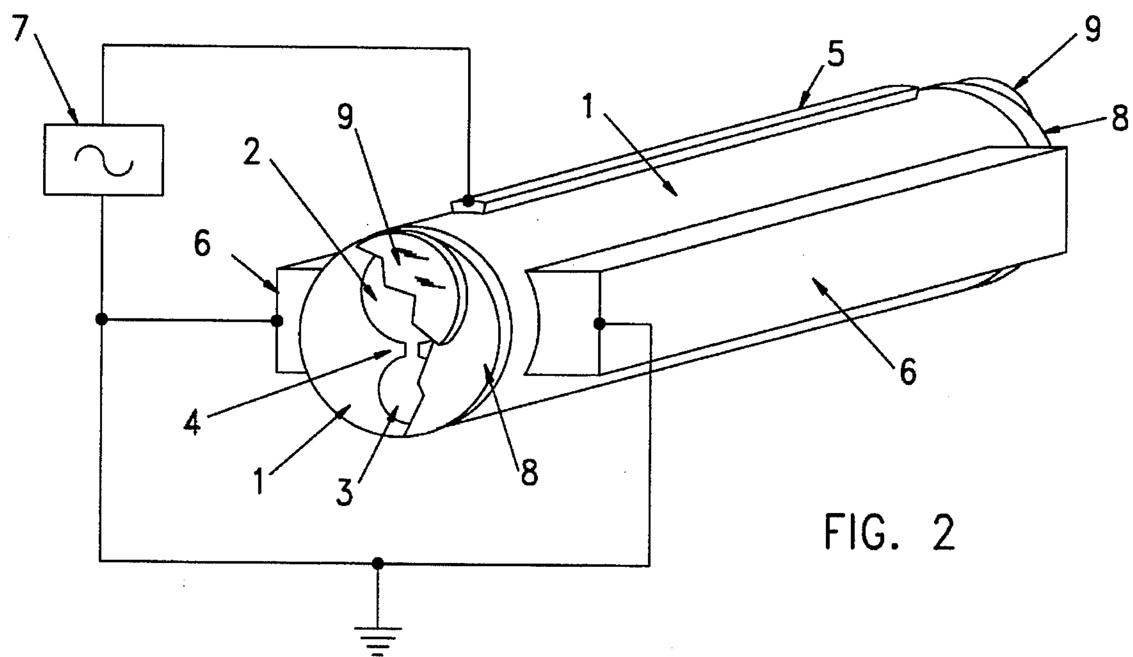
FIG. 2 is a schematic perspective view of the gas laser assembly of the present invention illustrating the elongated configuration of the chambers and electrodes, and showing, in partial cross-section, a pair of end plates sealing mounted to the ends of the internal chambers, a pair of laser optic reflectors mounted external to and sealed to the end plates, and the RF energy source, electrically coupled to the electrodes.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified high power gas laser generally indicated at 1.

The gas laser 1 is preferably fabricated from a single, continuous elongated piece of dielectric material, such as ceramic or glass, which may be of any shape, but which is preferably circular, between 0.75 to 1.0 inches in diameter, and may be of any desired length. The laser 1, includes a plurality of elongated cylindrical bores 2, 3, formed extending entirely therethrough between the ends thereof. The bores may also be of any shape, and are preferably parallel, with a first bore 2 forming an approximately 0.25 inches in diameter laser gas discharge chamber. The second bore 3, forms a laser gas reservoir chamber, which is preferably smaller than the first bore, but which may range in cross-section from about 0.20 to 0.25 inches. These elongated chambers 2 and 3 are fluidly connected by an opening 4, which may be of any desired length or width, but which is preferably a narrow slot, approximately 0.0625 inches wide, extending along the full length of the chambers 2 and 3, so that laser gas may flow freely between the chambers. These chambers 2 and 3 hold a sufficient amount of laser gas, such as $CO_2$, He, and $N_2$, at a pressure of about 1 torr to 1,000 torr to maintain a laser gas discharge therein. The preferred single piece of dielectric material forming the laser 1, allows for a structural shape of maximum mechanical rigidity and stiffness required for laser construction.

The laser 1 has a plurality of electrodes 5 and 6, constructed from an electrically conductive material. The first electrode 5 is secured to the external surface of the laser 1, and preferably extends longitudinally along the laser, adjacent to and parallel to the elongated gas discharge chamber 2. Second and third electrodes 6 are mounted on opposite sides and extend longitudinally along the gas laser 1. These second and third electrodes are preferably water cooled, symmetric to and form a ground plane for the first electrode. That is, the first electrode is preferably mounted midway between the two ground electrodes 6. An RF energy source 7 applies a voltage of alternating polarity to the first electrode 5 to establish a laser gas discharge in the laser gas discharge chamber 2, transversely to the length of this chamber. Symmetric cooling of the water cooled ground electrodes 6 against the external surface of the laser, outside of both the laser gas discharge chamber 2 and laser gas reservoir chamber 3, minimizes thermal distortions which would affect laser performance. The open ends of the laser 1 and elongated chambers 2 and 3 are provided with cover means, such as end plates 8, to hermetically seal these ends.

Two laser optic means, such as optical reflectors 9 are hermetically sealed in openings in the end plates 8, aligned with the open ends of the laser gas discharge chamber 2, to guide laser light energy from a gas discharge within the laser gas discharge chamber 2. The laser light produced therein is independent of the internal walls as it travels the length of the elongated cylindrical laser gas discharge chamber 2.

The pair of end plates 8 are preferably fabricated from a metal, such as stainless steel, and are securely fastened to the ends of the laser by air tight sealing means, such as washers or the like, made of indium alloy, about 0.005 inches thick. At least one of these end plates may have a fitting attached thereto to enable the laser to be filled with a selected laser gas, in a manner known to those skilled in the art. This fitting is normally pinched off after power testing of the laser. Each of the end plates preferably has a through opening formed therein, aligned with the laser gas discharge chamber end openings, and the laser optics 9 are mounted over these through openings in alignment with the laser gas discharge chamber end openings, preferably on adjustable mounts (not shown), and sealed air tight to the end plates, as by use of sealing means, such as 0.005 inch thick indium washers. The laser optic 9 at a first open end of the laser gas discharge chamber 2 preferably has an optical reflectivity of near 100 percent, and may be made of any desired material, such as silicon having a silver or gold coating. The laser optic 9 at the other or second open end of the laser gas discharge chamber 2, preferably has an optical reflectivity of about 85 to 95 percent and may made of any desired material, such as zinc selenide or germanium. These laser optics are adjusted in a manner known to those skilled in the art, to reflect the laser light energy from the gas discharge within the laser gas discharge chamber back on itself so as to travel longitudinally along the length of the laser gas discharge chamber and to be optically independent of the internal walls of the laser gas discharge chamber.

The 3 elongated, longitudinal electrodes, are made from any desired electrically conductive material. For example, the first electrode 5 is generally a 0.125 inch wide copper ribbon and forms the positive electrode. The other two electrodes 6, are generally about 0.375 inches wide and made of aluminum with a center passage for water cooling, in a manner known to those skilled in the art. These two water cooled electrodes 6 are placed on opposite sides of the laser 1 and symmetric with the positive electrode 5. These two water cooled electrodes 6 are electrically connected to ground and, in combination with the positive electrode, produce a transversely excited laser gas discharge within the laser gas discharge chamber 2, in a manner well known to those skilled in the art.

The RF power source 7 is electrically coupled to the electrodes 5 and 6 in a known manner, and provides an alternating electric field in the laser gas discharge chamber 2, in a direction transverse to the length of the laser gas discharge chamber, at a frequency from about 10 MHz to 3 GHz, to establish a laser gas discharge therein.

Those skilled in the art will appreciate that various adaptations and modification of the just-described preferred embodiments can be configured without departing from the scope and spirit of the invention. Therefore, it is to be understood that, within the scope of the appended claims, the invention may be practiced other than as specifically described herein.

What is claimed is:

1. A high energy gas laser comprising, in combination:

an elongated body made from a homogeneous dielectric material having an external surface and two ends;

first and second elongated chambers formed in and extending entirely along said elongated body, parallel to each other, between said two ends; each of said first and second elongated chambers having open ends;

a narrow slot formed between said first and second elongated chambers in said elongated body, fluidly connecting the same along their entire length to thereby relieve any gas pressure buildup during laser modulation and to interrupt an internal wall surface and prevent high order mode reflection;

a laser gas filling said first and second elongated chambers;

a plurality of electrodes secured to said external surface of said elongated body;

laser optics sealed to the open ends of the first elongated chamber and end caps sealed to the open ends of the second elongated chamber; and an external RF power source connected to said plurality of electrodes to produce a laser gas discharge in the first elongated chamber, with the second elongated chamber being a gas reservoir.

2. The high energy gas laser of claim 1 wherein said first elongated chamber has a thin exterior wall and a larger internal diameter than said second elongated chamber.

3. The high energy gas laser of claim 2 wherein there are three electrodes, a first of which electrodes is a positive electrode mounted longitudinally along the outside surface of said elongated body over said first elongated chamber in which said laser gas discharge is produced.

4. The high energy gas laser of claim 3 wherein a second and third of said three electrodes are cooling ground electrodes secured to said external surface of said elongated body opposite to each other and symmetric to said first positive electrode.

5. The high energy gas laser of claim 1 wherein there are three electrodes, a first of which electrodes is a positive electrode mounted longitudinally along the outside surface of said elongated body over said first elongated chamber in which said laser gas discharge is produced.

6. The high energy gas laser of claim 5 wherein a second and third of said three electrodes are water cooled ground electrodes secured to said external surface of said elongated body opposite to each other and symmetric to the first positive electrode.

7. The high energy gas laser of claim 6 wherein said first elongated chamber has a thin exterior wall and a larger internal diameter than said second elongated chamber.

8. The high energy gas laser of claim 1 wherein there are three electrodes secured longitudinally on said external surface of said elongated body, parallel to said first and second elongated chambers; a first of said three electrodes being a positive electrode and being mounted on said external surface of said elongated body over said first elongated chamber; and a second and third of said three electrodes are water cooled ground electrodes mounted on said external surface of said elongated body, opposite to each other and symmetric to said positive electrode, to cool both said first and second elongated chambers.

9. A high energy gas laser comprising in combination:

an elongated cylindrical, one piece body made from a dielectric material; said elongated cylindrical body having a length, an external surface and two ends;

an elongated, cylindrical laser gas discharge chamber formed in said elongated cylindrical body and having two open ends;

reflecting laser optics sealingly connected so as to cover said two open ends of said elongated, cylindrical laser gas discharge chamber;

an elongated, cylindrical gas reservoir chamber formed in said elongated cylindrical body, parallel to said elongated, cylindrical laser gas discharge chamber; said elongated cylindrical gas reservoir chamber also having two open ends;

end plates sealingly coupled to said two open ends of said elongated cylindrical gas reservoir chamber;

a laser gas filling said elongated, cylindrical laser gas discharge chamber and said elongated cylindrical gas reservoir chamber;

an elongated narrow slot formed in said elongated cylindrical body fluidly connecting said elongated, cylindrical laser gas discharge chamber with said elongated, cylindrical gas reservoir chamber along their entire lengths to thereby relieve any gas pressure buildup during laser modulation and to interrupt an internal wall surface and prevent high order mode reflection;

three elongated electrodes secured to said external surface of said elongated, cylindrical body and extending parallel to said elongated, cylindrical laser gas discharge chamber and second elongated, cylindrical gas reservoir chamber; two of said elongated electrodes acting as cooling electrodes; and an external RF power source electrically coupled to said three elongated electrodes to produce a laser gas discharge in said elongated, cylindrical laser gas discharge chamber.

10. The high energy gas laser of claim 9 wherein said three elongated electrodes are comprised of a first positive electrode secured to said external surface of said elongated, cylindrical body over said elongated, cylindrical laser gas discharge chamber, and second and third water cooled hollow ground electrodes secured to said external surface of said elongated, cylindrical body in positions which are symmetrical to said first positive electrode and whereby they may cool said first elongated, cylindrical laser gas discharge chamber and said second elongated, cylindrical gas reservoir chamber.

11. The high energy gas laser of claim 9 wherein said first elongated chamber has a thin exterior wall and a larger internal diameter than said second elongated chamber.

12. A transversely excited non-waveguide, large bore, high energy gas laser, comprising in combination:

an elongated one piece body made from a homogenous dielectric material; said elongated one piece body having a length, an external surface and two ends;

a first elongated laser gas discharge chamber and a second parallel elongated laser gas reservoir chamber formed in said elongated one piece body extending between the two ends thereof;

an elongated narrow opening fluidly connecting the first laser gas discharge chamber and the second parallel elongated laser gas reservoir chamber along the entire length of each of the respective chambers to thereby relieve any gas pressure buildup during laser modulation and to interrupt an internal wall surface and prevent high order mode reflection;

an end plate sealing connected to each of said two ends of said elongated one piece body;

a reflecting laser optic sealing connected in each end plate, at open ends of said first elongated laser gas discharge chamber, to extract laser light energy therefrom;

a laser gas inserted and held in said first elongated laser gas discharge chamber and said parallel second elongated laser gas reservoir chamber;

a single positive electrode secured longitudinally along an exterior surface of said elongated one piece body adjacent to a thin exterior wall of said first elongated laser gas discharge chamber;

a pair of water cooled ground electrodes secured longitudinally along said exterior surface of said elongated one piece body on opposite sides thereof and symmetric to the single positive electrode; said pair of water cooled ground electrodes acting to cool said first elongated laser gas discharge chamber and said second parallel elongated laser gas reservoir chamber; and an external RF power source electrically coupled to the electrodes to produce a laser gas discharge in said first elongated laser gas discharge chamber.

13. The transversely excited non-waveguide, large bore, high energy, gas laser of claim 32 wherein both said first elongated laser gas discharge chamber and said second parallel elongated gas reservoir chamber are circular in cross-section, and said first elongated laser gas discharge chamber has a larger internal diameter than said second parallel elongated gas reservoir chamber.

* * * * *